UNITED STATES PATENT OFFICE.

MORITZ ULRICH, OF ELBERFELD, GERMANY, ASSIGNOR TO THE FARBEN-FABRIKEN, VORMALS FR. BAYER & CO., OF SAME PLACE.

BLACK DYE.

SPECIFICATION forming part of Letters Patent No. 560,334, dated May 19, 1896.

Application filed August 6, 1895. Serial No. 558,403. (Specimens.)

*To all whom it may concern:*

Be it known that I, MORITZ ULRICH, doctor of philosophy, chemist, (assignor to the FARBENFABRIKEN, VORMALS FR. BAYER & CO., of Elberfeld, Prussia, Germany,) a subject of the Emperor of Germany, residing at Elberfeld, Germany, have invented a new and useful Improvement in the Manufacture of Black Dye; and I do hereby declare the following to be an exact and clear description of my invention.

My invention relates to the production of dyestuffs which possess the valuable property of dyeing unmordanted cotton either in cold baths or in hot baths in shades from bluish-gray to deep black, which dyes are producible by treating with alkaline sulfids or the like agents the dinitrohalogen-naphthalenes—as, for example, dinitrochloronaphthalene, (see *Berichte der Deutschen Chemischen Gesellschaft* IX, 927 and 928,)—in the manner hereinafter described.

In carrying out my invention practically I can proceed as follows, (without limiting myself to the particulars given in the following example:) Forty-five parts, by weight, of dinitrochloronaphthalene (prepared in the manner as described in the *Berliner Berichte* IX, 927 and 928 or in any suitable analogous manner) are gradually introduced into a boiling solution of two hundred and twenty-five parts, by weight, of crystallized sodium sulfid ($Na_2S + 9H_2O$) in one thousand liters of water. A violent action takes place, the mass being spontaneously heated to boiling. As the dinitrochloronaphthalene becomes dissolved, the mixture assumes a darkish-red color. If the intensity of the color no longer increases, the resulting liquid is filtered and the filtrate thus obtained is mixed with five hundred parts, by weight, of hydrochloric acid, (20° Baumé,) a gray precipitate being formed in this manner. This acid mixture is heated for about one hour, by reason of which operation the precipitate becomes greenish black. The latter is filtered off and washed with water. The so-formed precipitate is insoluble in solutions of sodium carbonate and cold dilute soda-lye, but readily dissolves in a solution of sodium sulfid or the like and in warm soda-lye or the like, yielding violet-black solutions from which the dyestuff does not separate on cooling. It dyes unmordanted cotton when introduced into such alkaline solutions of the dyestuff, and when allowed to remain therein during about from three to twenty-four hours assumes from bluish-gray to deep black shades fast against the action of light and of acids and likewise against washing and milling.

The dyestuff as obtained according to the directions given above forms when dried and pulverized a greenish-black powder, insoluble in cold and hot water, likewise insoluble in alcohol, ammonia liquor, and concentrated sulfuric acid (66° Baumé). The dyestuff, however, is dissolved by hot soda-lye solution (35° Baumé) without being separated when the hot alkaline solution is either cooled down or diluted with cold water, and the dye is further dissolved by solutions of sodium sulfid or the like in water.

Of course I do not limit myself to the particulars given in the above example. The result of the process is not affected if other quantities of sodium sulfid are employed; but I have found it best not to use very small quantities of these agents nor to effect the formation of the dyestuff in too dilute a solution, as in this case only relatively small quantities of the dyestuff are formed. On the other hand the temperature at which the reaction is effected can be varied within certain limits.

Analogous or similar dyestuffs are obtained if the above employed dinitrochloronaphthalene is replaced by the isomeric body, which has the constitution: $NO_2:NO_2:Cl = 1:5:8$ or if a mixture of the two isomeric dinitrochloronaphthalenes $NO_2:NO_2:Cl = 1:5:8$ and $NO_2:Cl:NO_2 = 1:4:8$ is heated with alkaline sulfids.

Having now described my invention and in what manner the same may be performed, what I claim as new, and desire to secure by Letters Patent, is—

1. The process for the production of dyes dyeing unmordanted cotton material in cold or hot baths, yielding from grayish-blue to deep black shades, and derived from the reaction of alkali sulfids on dinitrohalogen-naphthalenes, and filtering and treating the liquid mixture with acids, in the manner hereinbefore described.

2. As a new article of manufacture the product which may result from the action of alkaline sulfids on dinitrochloronaphthalene and subsequently treating the liquid mixture when previously filtered with acids as set forth, which product forms, when dried and pulverized a greenish-black powder, insoluble in water, alcohol and sulfuric acid, but soluble in hot soda-lye and especially in solution of alkaline sulfids in water and being thus capable of dyeing cotton in a cold or hot bath in shades yielding from grayish-blue to deep black shades very fast to the action of alkali, acids, soaping and milling.

In testimony whereof I have signed my name in the presence of two subscribing witnesses.

MORITZ ULRICH.

Witnesses:
F. H. STRAUSS,
R. E. JAHN.